Oct. 6, 1953 L. G. FISCHER 2,654,866

RADIO FREQUENCY AMPLITUDE CONTROL DEVICE

Filed Aug. 23, 1951

INVENTOR
LAURIN G. FISCHER
BY Percy P. Lantzy
ATTORNEY

Patented Oct. 6, 1953

2,654,866

UNITED STATES PATENT OFFICE 2,654,866

RADIO FREQUENCY AMPLITUDE CONTROL DEVICE

Laurin G. Fischer, North Arlington, N. J., assignor to Federal Telecommunication Laboratories, Inc., Nutley, N. J., a corporation of Delaware Application August 23, 1951, Serial No. 243,283

14 Claims. (Cl. 332—56)

This invention relates to radio frequency amplitude control devices and more particularly to a device for adjusting or modulating the amplitude of radio frequency waves.

Attempts have been made heretofore to provide devices for changing the amplitude of a radio frequency wave without changing the characteristics of the transmitter load impedance or without introducing some phase shift between the input and output waves. Such attempts, however, have not proved entirely satisfactory either because the phase or the load impedance varied during the change of amplitude or the apparatus was too complicated.

One of the principal objects of this invention is to provide means for adjusting the amplitude of a radio frequency wave in such a manner as to maintain a purely resistive and/or constant load on the transmitter.

A further object is to provide means for adjusting or modulating the amplitude of an input radio frequency wave in such a manner that the output wave or waves will always be in like phase with the input wave.

A feature of this invention is the simplicity of the amplitude control device. The device, for example, may employ conductors and a pair of given loads connected to form a closed loop in which the given loads are substantially a half wavelength apart. The input to the loop is by means of a pair of movable coupling elements. The output is taken off at the given loads either as the sine or cosine of the angle of rotation of the coupling elements, or both simultaneously. The amplitude of the output waves vary with the positioning of the coupling elements along the perimeter of the loop. The two output waves absorb the input energy in a complementary manner, thus providing a purely resistive load on the transmitter without any phase shift being introduced.

Another feature of this invention is the radio frequency amplitude modulating capabilities of the device. Modulation is obtained by rotating coupling elements within a circular loop wherein the amplitude modulating function may be expressed as directly equal to the sine of the rotational angle. Useful outputs controlled in amplitude are obtainable. For example, if the modulation desired is $f(x)$, then the rotational function $$f(\theta)=[\text{sine}^{-1}f(x)]$$

The above-mentioned and other features and objects of this invention will become more apparent by reference to the following description of certain embodiments of the invention taken in conjunction with the accompanying drawings, wherein.

Figure 1:
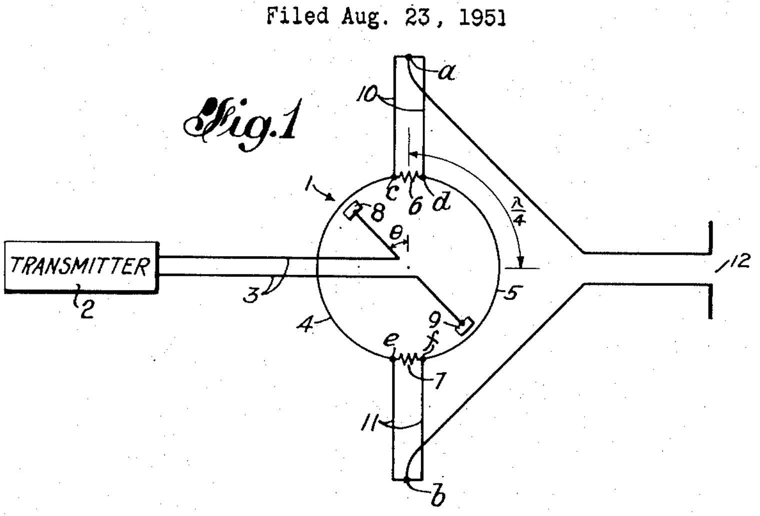
Fig. 1 is a schematic representation of a device according to the principles of this invention.

Referring to Fig. 1, an amplitude control device 1 is shown coupled to a transmitter 2 through a balanced line 3. The device 1 comprises a loop composed of two conductors 4 and 5, each substantially a half wavelength long or multiple thereof, joined by given load resistors 6 and 7 sometimes hereinafter referred to as internal or "dump" loads. Two movable coupling capacitive elements 8 and 9 transmit the input to the loop. Two shorted output connectors 10 and 11, each a quarter or an odd multiple of a quarter wavelength long, are connected at the resistive loads 6 and 7. An external load 12 is connected to the center of the shorted ends of these output connectors 10 and 11.

While resistive loads 6 and 7 may be referred to as "dump" loads, they may also be "useful" loads. In one example where it is desired to feed quadrature modulation voltages to equal pairs of antennas, one phase can be obtained from points $a$, $b$ as the cosine of the rotational angle $\theta$ of elements 8 and 9, while another voltage phase is obtained from both sets of points $c$, $d$ and $e$, $f$ as the sine of the rotational angle.

Since coupling elements 8 and 9 are fed from a balanced line 3, they are 180° out of phase. If the coupling elements are displaced midway between the resistive loads 6 and 7, the voltage appearing at point $a$ from coupling element 8 will be equal and of the same sign to the voltage appearing at point $b$ from coupling element 9. The voltages at $c$ and $d$ due to coupling elements 8 and 9 are equal and opposite in sign, likewise, the voltages at $e$ and $f$ are equal and opposite. Thus, for the midway positioning of elements 8 and 9, no power will be fed to the external load 12, but all of the power will be dissipated in resistive loads 6 and 7. If the coupling elements 8 and 9 are moved so they are directly opposite resistive loads 6 and 7, the voltages appearing at points $c$ and $d$ are equal and of like sign. This is also true of the voltages at points $e$ and $f$. The voltages at points $a$ and $b$ are now equal but of opposite sign so that no power is now absorbed by loads 6 and 7, but all the power is dissipated at the load 12, provided, of course, that all transmission line impedances and loads are matched. In an intermediate positioning of the elements 8 and 9, such as shown in Fig. 1, the power will be divided between the two loads 6, 7 on the one hand and, on the other hand, the external load 12. The loads at 6, 7, and 12 may all comprise useful loads, the output at points $a$ and $b$ being proportioned to cosine $\theta$, and the output between $c$ and $d$ on the one hand and $e$ and $f$ on the other hand being each proportional to sine $\theta$. The loads of $c$, $d$ and $e$, $f$ are each equal to $2Z_0$, and the load at $a$ and $b$ is equal to $Z_0$.

Figure 2:
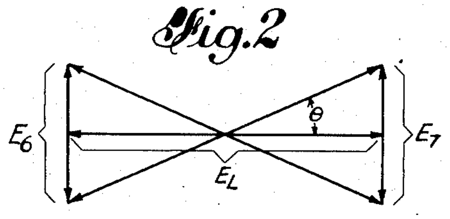
Fig. 2 is a diagram of the voltage vector relations existing in the device of Fig. 1.

Referring to Fig. 2, the voltage vector relations existing in the amplitude control device of Fig. 1 is shown as when the coupling elements are in an intermediate position, displaced from the resistors 6 and 7 by an angle $\theta$. The voltage drop across the internal loads are $E_6$ and $E_7$. These voltages vary as the sine $\theta$. The voltage drop across the external load $E_L$ varies as cosine $\theta$. The total load supplied by the transmitter when each resistor has a resistance of twice the external load $Z_0$ is:

$$P=\frac{E_L^2}{Z_0}+\frac{E_6^2}{2Z_0}+\frac{E_7^2}{2Z_0}$$

and $$P=\frac{E^2\cos^2\theta}{Z_0}+E^2\sin^2\theta\left(\frac{1}{2Z_0}+\frac{1}{2Z_0}\right)$$

which equals $$\frac{E^2}{Z_0}(\cos^2\theta+\sin^2\theta)=\frac{E^2}{Z_0}$$

Hence the load on the transmitter is constant and not affected by the position of the coupling elements.

Figure 3:
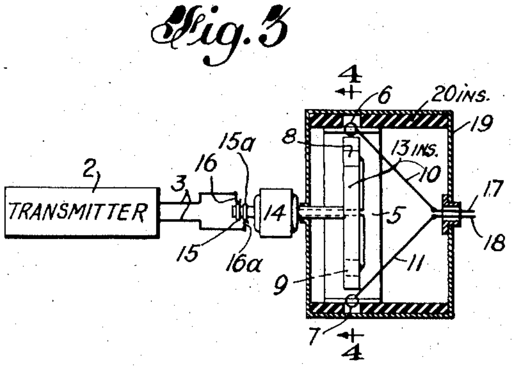
Fig. 3 is a longitudinal sectional view of one embodiment for use as a balanced sinusoidal amplitude modulator.
Figure 4:
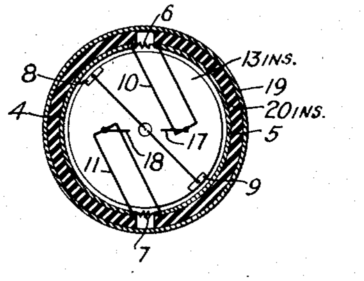
Fig. 4 is a cross-sectional view taken along the line 4—4 of Fig. 3.

An embodiment of the device shown schematically in Fig. 1 is illustrated as a balanced sinusoidal amplitude modulator in Figs. 3 and 4. The same reference characters are used for corresponding parts in the two illustrations. A disc 13, made of insulating material supports the two coupling elements 8 and 9 and is caused to rotate within the circular loop by means of a motor 14. The coupling elements 8 and 9 are connected to the input by means of a balanced line 3 through slip rings 15, 15$a$ and brushes 16, 16$a$, the rings being conductively coupled to the coupling elements 8 and 9, respectively. The quarter wavelength shorted output connectors 10 and 11 are connected across said resistors 6 and 7 and are inclined from the periphery of the loop and are joined to output connectors 17, 18, respectively, at the center of their shorted ends. The loop and coupling elements are preferably contained in a housing 19 lined with insulation 20. If the coupling elements are rotated at a constant angular velocity, the input wave is amplitude modulated without any phase shift. By replacing the motor 14 with a manual control, the unit may be used as an amplitude adjustor.

Figure 5:
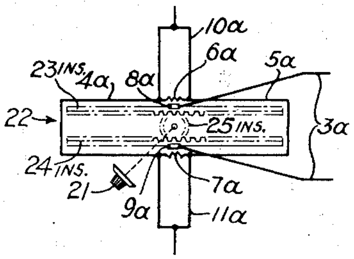
Fig. 5 is a view in side elevation of another embodiment for use as an amplitude adjustor.

In the embodiment shown in Fig. 5 a manual control 21 is shown in association with a rectangular loop 22. The rectangular loop comprises two conductors 4$a$ and 5$a$, each a half wavelength long joined by two resistors 6$a$ and 7$a$. Two racks 23 and 24 of insulating material, such as "Micarta," are shown carrying the two coupling elements 8$a$ and 9$a$ connected to an input by means of a balanced line 3$a$. The racks are laterally displaced, by means of the manual control 21 operatively connected to a pinion 25, equal distances from resistors 6$a$ and 7$a$ and in opposite directions. The output is taken from across said resistors by means of quarter wavelength connectors 10$a$ and 11$a$ as described in connection with Fig. 1.

Many variations in the structure of the embodiments shown will occur to those skilled in the art, for example, replacing the capacitive coupling elements 8 and 9 with sliding contacts is believed preferable in some applications, also the conductors 4 and 5 may be of any desired cross-sectional shape or loop arrangement. Further, where the conductors 4 and 5 are said in the claims to be equal substantially to a half wavelength each, such expression is intended to cover multiples of a half wavelength as well. Also, where the shorted stubs 10 and 11 are referred to as equal to substantially a quarter wavelength, the same is intended to include odd multiples of a quarter wavelength. It is to be understood, therefore, that the particular embodiments disclosed in this application are to be regarded as illustrative only and not as a limitation to the invention as set forth in the objects thereof and the accompanying claims.

I claim:

1. A radio frequency amplitude control device comprising two substantially half wavelength conductors and a pair of given loads coupling said conductors in series to form a loop, a third load, a pair of output connectors each equal to substantially a quarter wavelength, each of said connectors being coupled to said loop at the terminals of said given loads, means to couple said third load to said connectors, a pair of input coupling elements disposed in coupling relation to said loop at points spaced apart along said loop by substantially a half wavelength, and means for changing the coupling position of said elements with respect to said loop.

2. A device according to claim 1, wherein said connectors comprise two quarter wavelength shorted stubs, the legs of one stub being coupled to the terminals of one of said given loads and the legs of the other stub being coupled to the terminals of the other of said given loads.

3. A device according to claim 1, wherein the perimeter of said loop is equal to one wavelength and said given loads are separated by loop portions, each equal substantially to a half wavelength.

4. A device according to claim 1, wherein said loop is of circular configuration and said given loads are located at diametrically opposed points in said loop.

5. A device according to claim 4, wherein the said means for changing the coupling position of said elements includes a rotor supporting said coupling elements for rotation.

6. A device according to claim 1, wherein said loop is of rectangular configuration and said given loads are coupled in opposite sides of said rectangle.

7. A device according to claim 6, wherein said means for changing the coupling position of the coupling elements includes means for moving the said coupling elements equal distances in opposite directions.

8. A device according to claim 7, wherein said last-mentioned means includes a pair of racks and a pinion in mesh therewith, each rack carrying one of said coupling elements.

9. A radio frequency amplitude modulating device comprising a circular loop composed of two conductors each substantially a half wavelength long and two given loads joining said conductors, two coupling elements, a disc of insulating material on which said coupling elements are mounted at diametrically opposite points and disposed in coupling relation to said loop, a transmitter, means to couple said transmitter to said disc, means to rotate said coupling elements in accordance with the modulations desired, two substantially quarter wavelength shorted stubs, each connected to the terminals of one of said given loads, output connectors connected to said shorted stubs at their shorted ends, a third load connected to said output connectors, the resistance of said third load being substantially equal to one half the resistance of each of the said given loads, whereby the output wave is modulated in accordance with the rotational angular velocity of said coupling elements.

10. A device according to claim 9, wherein said means to rotate said coupling elements includes a constant speed motor operatively connected to said disc whereby said coupling elements will be rotated at constant angular velocity and the output wave will be sinusoidally modulated.

11. A device according to claim 9, wherein said means to connect the transmitter to said coupling elements includes a balanced line, brushes, and slip rings.

12. A radio frequency amplitude control device comprising a loop circuit having in series a first conductor, a first load, a second conductor, and a second load, each of said conductors being equal substantially to one-half wavelength, a source of input energy, means to capacitively couple said energy to said loop circuit at points spaced apart by substantially a half wavelength, means for varying the position of said capacitive coupling with respect to said first and second loads, a first and second output connector each substantially a multiple of a quarter wavelength coupled respectively to the terminals of said first and second loads, a third load, and means to couple said third load to said first and second output connectors.

13. A radio frequency amplitude adjusting device comprising a rectangular loop composed of two conductors and two given loads, said loads coupling said conductors in series to form said rectangular loop, said conductors being substantially a half wavelength long, a pair of input coupling elements disposed in coupling relation to said loop at points spaced apart along said loop by substantially a half wavelength, means for moving said coupling elements equal distances in opposite direction along opposite sides of said rectangular loop, two quarter wavelength shorted output connectors each coupled to the terminals of one of said two given loads, and a third load connected to the shorted ends of said output connectors, said third load having a resistance equal substantially to one half the resistance of each of said given loads.

14. A device according to claim 13, wherein the means for moving said coupling elements comprises a rack and pinion mechanism and means for controlling said mechanism.

LAURIN G. FISCHER.

References Cited in the file of this patent

UNITED STATES PATENTS

| Number | Name | Date |
|---|---|---|
| 2,368,693 | Watts, Jr. | Feb. 6, 1945 |
| 2,451,201 | Clark, Jr. | Oct. 12, 1948 |
| 2,492,138 | Earp | Dec. 27, 1949 |